(12) United States Patent
Kawanishi et al.

(10) Patent No.: US 8,157,129 B2
(45) Date of Patent: Apr. 17, 2012

(54) VOLUMETRIC FEEDER FOR POWDERY- OR GRANULAR-MATERIAL AND POWDERY- OR GRANULAR-MATERIAL COMBINATION WEIGHER

(75) Inventors: Shozo Kawanishi, Nishinomiya (JP); Kazuo Usui, Akashi (JP)

(73) Assignee: Yamato Scale Co., Ltd., Akashi-shi (JP)

( * ) Notice: Subject to any disclaimer, the term of this patent is extended or adjusted under 35 U.S.C. 154(b) by 784 days.

(21) Appl. No.: 10/494,832

(22) PCT Filed: Nov. 6, 2002

(86) PCT No.: PCT/JP02/11552
§ 371 (c)(1),
(2), (4) Date: Aug. 5, 2004

(87) PCT Pub. No.: WO03/040668
PCT Pub. Date: May 15, 2003

(65) Prior Publication Data
US 2004/0245283 A1 Dec. 9, 2004

(30) Foreign Application Priority Data
Nov. 6, 2001 (JP) ................... 2001-340803

(51) Int. Cl.
*B67D 1/00* (2006.01)
*B67D 7/14* (2010.01)
(52) U.S. Cl. ....... 222/56; 222/426; 222/168.5; 222/434; 222/305; 222/361

(58) Field of Classification Search ............. 222/56, 222/361, 362, 431, 55, 236, 426, 425, 168.5, 222/428, 434, 450, 453, 380, 305, 347, 344, 222/307, 290, 282
See application file for complete search history.

(56) References Cited

U.S. PATENT DOCUMENTS

| | | | |
|---|---|---|---|
| 3,179,304 A | 4/1965 | Heilbrunn | |
| 4,179,041 A | 12/1979 | Chambon | |
| 4,308,928 A * | 1/1982 | Oshima | 177/25.18 |
| 4,359,935 A * | 11/1982 | Murray | 99/331 |
| 4,569,406 A | 2/1986 | Pringle et al. | |

(Continued)

FOREIGN PATENT DOCUMENTS

JP 60-522 1/1985

(Continued)

*Primary Examiner* — Kevin P Shaver
*Assistant Examiner* — Melvin Cartagena
(74) *Attorney, Agent, or Firm* — Alleman Hall McCoy Russell & Tuttle LLP

(57) ABSTRACT

A volumetric feeder made of a plurality of independent feeder elements 20a, 20b. Each of the feeder elements is provided with a stationary portion 21 and a movable volumetric measure 22 that moves back and forth in the stationary portion 21. Each movable volumetric measure is provided with a measure portion 23 for accommodating a predetermined volume of powdery or granular material. The movable volumetric measure in the feeder elements are capable of moving independently of one another between a charging position at which the measure portions 23 coincide with charging apertures 24 of the stationary portion 21, and a discharging position at which the measure portions 23 coincide with discharging apertures 26 of the stationary portion 21.

14 Claims, 10 Drawing Sheets

U.S. PATENT DOCUMENTS

| | | | |
|---|---|---|---|
| 4,781,308 A | | 11/1988 | Yamano et al. |
| 4,825,896 A | | 5/1989 | Mikata et al. |
| 5,054,652 A | * | 10/1991 | Oshima et al. .................... 222/1 |
| 5,767,453 A | * | 6/1998 | Wakou et al. .............. 177/25.18 |
| 6,161,733 A | * | 12/2000 | King ............................ 222/380 |
| 6,291,781 B1 | | 9/2001 | Ohtani et al. |
| 6,607,098 B2 | * | 8/2003 | Yamamoto ..................... 222/52 |

FOREIGN PATENT DOCUMENTS

| | | |
|---|---|---|
| JP | 60-165521 | 8/1985 |
| JP | 62-111525 | 7/1987 |
| JP | 63-169305 | 7/1988 |
| JP | 05-018808 | 1/1993 |
| JP | 05-118902 | 5/1993 |

* cited by examiner

VOLUMETRIC FEEDER FOR POWDERY- OR GRANULAR-MATERIAL AND POWDERY- OR GRANULAR-MATERIAL COMBINATION WEIGHER

TECHNICAL FIELD

The present invention relates to a volumetric feeder for powdery or granular materials and a powdery- or granular-material combination weigher, and more particularly to a volumetric feeder that is usable for a combination weigher for powdery or granular materials, and a powdery- or granular-material combination weigher provided with the volumetric feeder.

BACKGROUND ART

FIGS. 9a and 9b illustrate plan views of a conventional multiple volumetric feeder, and FIGS. 8a and 8b illustrate side views of this multiple volumetric feeder to which a raw-material-supplying hopper 95 is fitted. Conventional multiple volumetric feeders include those of reciprocating-type and those of rotating-type, as shown in FIGS. 9a and 9b and FIGS. 8a and 8b, respectively. The volumetric feeders shown in FIGS. 8a to 9b are furnished with a stationary portion 91, a movable volumetric measure 92 capable of moving back and forth in the stationary portion 91, and the movable volumetric measure 92 is furnished with a plurality of measure portions 93 for accommodating a predetermined volume of powdery or granular material. The stationary portion 91 is provided with a plurality of charging apertures 94 for supplying a powdery or granular material to the measure portions 93, and a plurality of discharging apertures 96 for discharging the powdery or granular material from the measure portions 93. In the multiple volumetric feeder thus configured, the powdery or granular material is supplied to all the measure portions 93 from the charging apertures 94 when the movable volumetric measure 92 is positioned on a raw-material-supplying hopper 95 side as shown in FIGS. 8a and 9a, whereas when the movable volumetric measure 92 is positioned on the far side from the raw-material-supplying hopper 95 as shown in FIGS. 8b and 9b, the powdery or granular material is discharged from all the measure portions 93 through the discharging apertures 96. This type of configuration, in which the powdery or granular material is simultaneously discharged from all the measure portions 93, is common to both the reciprocating-type and the rotating-type, and the function to supply the powdery or granular material only from a specific feeder is not provided.

In addition, in the conventional volumetric feeders, volume adjusting is performed for the purpose of making weights uniform, and based on the measurement results of the weight of the raw material discharged from a volumetric feeder, the weight of the raw material that goes into the measures of the volumetric feeder is manually changed by, for example, a gate 97 or the like as shown in FIG. 10.

In using such a conventional volumetric feeder for a powdery- or granular-material combination weigher, the number of the scale units used for a combination to obtain a target weight is usually 4 to 5, for example, in the case where the powdery- or granular-material combination weigher comprises 12 scale units, and the weighing hoppers of the scale units used for the combination are emptied and therefore must be resupplied with the powdery or granular material. However, since the weighing hoppers that have not been used for the combination must not be supplied with the powdery or granular material, the above-described conventional multiple volumetric feeders as they are cannot be employed for a powdery- or granular-material combination weigher, and a mechanism is required that is capable of supplying the raw material only to desired heads.

Then, the average value of the weights that are charged to the weighing hoppers of the scale units is represented as (target weight)/(number of scale units to be combined). If, for example, the weight of the powdery or granular material in each of the scale units results in a weight less than the above-described average value, an appropriate combination cannot be obtained. For a specific example, assuming that the targeted combination weight is 100 g and the number of scale units to be combined is 4, the average weight of the powdery or granular material to be charged into the weighing hopper of each of the scale units is 25 g. If, however, the weights of the powdery or granular material in the weighing hoppers become uniform at about 23 g in a condition that does not permit a weight less than a specified weight, the weight that is closest to the target will be 23 g×5=115 g, producing a margin of error of as large as 15 g. For this reason, in a combination weighing system, it is necessary to impart appropriate variations to the weights of the powdery or granular material in the scale units.

The present invention has been accomplished to solve such problems in the prior art. It is an object of the present invention to provide a volumetric feeder that can be used for a powdery- or granular-material combination weigher, and it is another object of the present invention to provide a powdery- or granular-material combination weigher that uses such a volumetric feeder.

DISCLOSURE OF THE INVENTION

A volumetric feeder of the present invention is a volumetric feeder used for a powdery- or granular-material combination weigher provided with a plurality of scale units having respective weighing hoppers, and comprises a selecting means for supplying a powdery or granular material only to the weighing hoppers of the scale units selected from the plurality of scale units. Since the selecting means for supplying a powdery or granular material only to the weighing hoppers of the selected scale units is provided for the volumetric feeder, the powdery or granular material can be supplied only to the weighing hoppers of the scale units that have been used for a combination and emptied.

Furthermore, the volumetric feeder is provided with a movable volumetric measure that moves between a charging position at which a predetermined volume of powdery or granular material is charged and a discharging position at which the powdery or granular material is discharged to the weighing hoppers, and the selecting means controls moving of the movable volumetric measure between the charging position and the discharging position, whereby the powdery or granular material is supplied only to the weighing hoppers of the selected scale units. Since such a movable volumetric measure is provided and, moving of the movable volumetric measure between the charging position and the discharging position is controlled by the selecting means, the powdery or granular material can be supplied only to the weighing hoppers of the scale units that have been used for a combination and emptied.

Alternatively, the volumetric feeder may be characterized in that it is provided with a movable volumetric measure that moves between a charging position at which a predetermined volume of powdery or granular material is charged and a discharging position at which the powdery or granular material is discharged to the weighing hoppers, and the selecting means is either a charge-restricting plate provided at the charging position or a discharge-restricting plate provided at the discharging position. With the configuration in which the charge-restricting plate or the discharge-restricting plate is provided as well, the powdery or granular material can be supplied only to the weighing hoppers of the scale units that have been used for a combination and emptied.

A volumetric feeder for a powdery- or granular-material combination weigher of the present invention is a volumetric feeder used in a powdery- or granular-material combination weigher provided with a plurality of scale units having respective weighing hoppers, and comprises a weight-controlling means for producing a variation in weights of a powdery or granular material supplied to the weighing hoppers. By the provision of the weight-controlling means, an appropriate variation can be generated in weights of the powdery or granular material supplied to the weighing hoppers of the scale units, and the powdery or granular material in all the weighing hoppers can be used for a combination.

Herein, in the configuration in which the movable volumetric measure that moves between a charging position and a discharging position, the weight-controlling means is configured by adjusting the charging position of the movable volumetric measure so that the variation is generated in weights of the powdery or granular material supplied to the weighing hoppers. Alternatively, the weight-controlling means may be configured as an opening-size adjusting plate provided at a charging aperture for a powdery or granular material in the volumetric measure.

A powdery- or granular-material combination weigher of the present invention comprises any one of the above-described volumetric feeders as a feeder for a powdery or granular material. Due to the provision of the above-described volumetric feeder, the powdery- or granular-material combination weigher of the present invention can supply a powdery or granular material only to the weighing hoppers of the scale units that have been used for a combination and emptied, and it becomes possible to adopt a combination weigher for weighing powdery or granular materials. In addition, an appropriate variation is generated in weights of the powdery or granular material supplied to the weighing hoppers in the scale units, and the powdery or granular material in all the weighing hoppers can be used for a combination.

BEST MODE FOR CARRYING OUT THE INVENTION

Figure 1A:
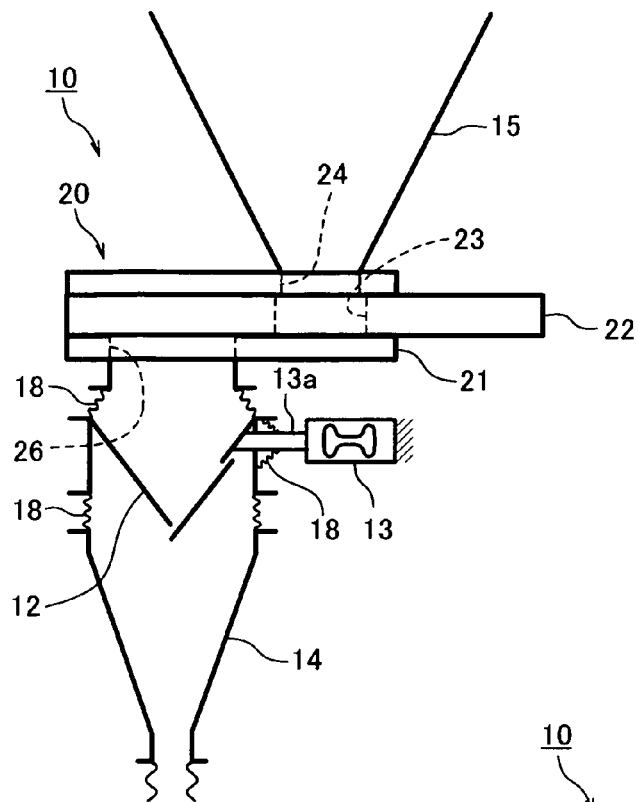
FIGS. 1a and 1b are side views of a powdery- or granular-material combination weigher according to one embodiment of the present invention.
Figure 1B:
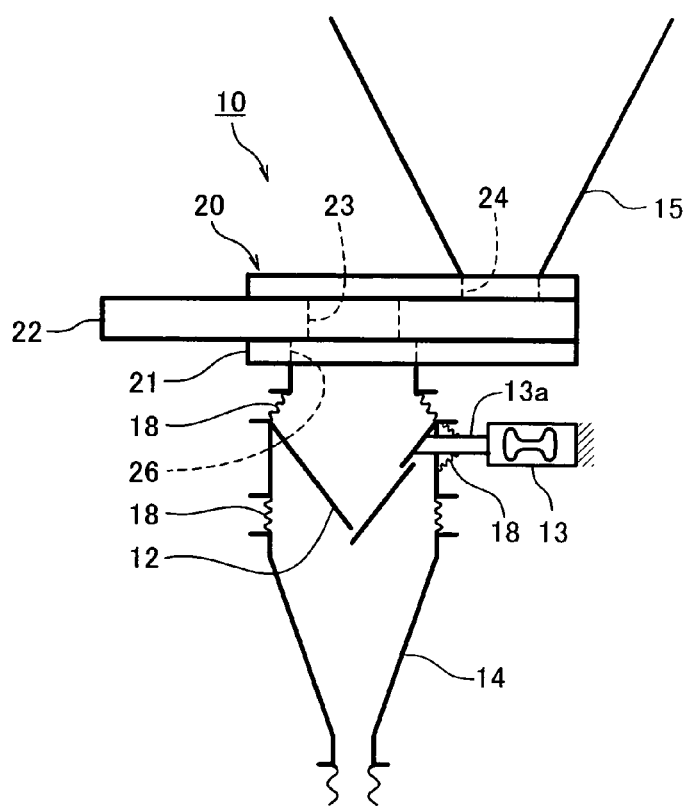
Figure 2A:
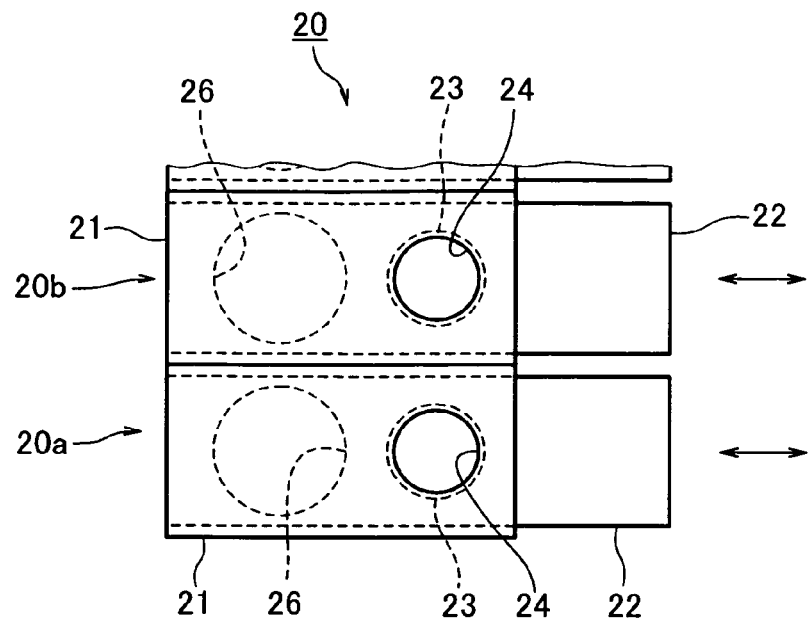
FIGS. 2a and 2b are plan views illustrating a volumetric feeder for a powdery- or granular-material combination weigher, attached to the powdery- or granular-material combination weigher of FIGS. 1a and 1b.
Figure 2B:
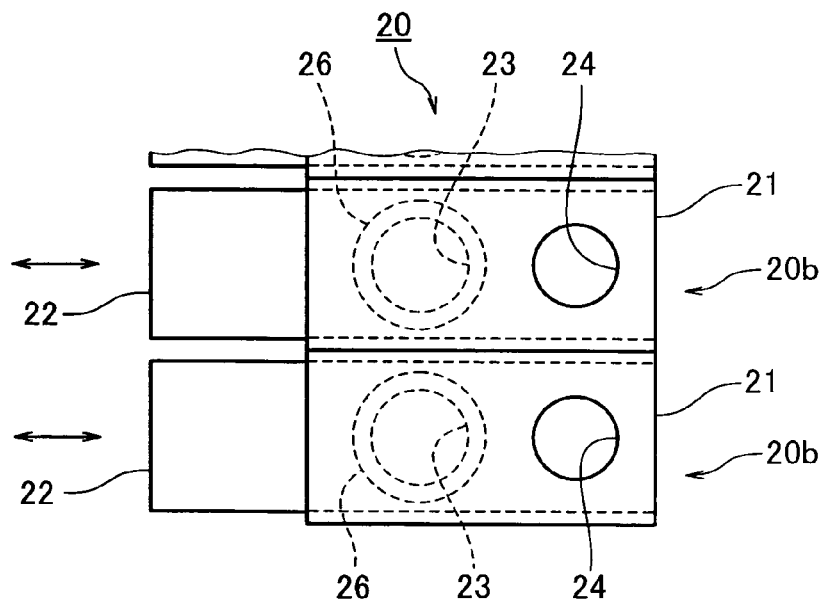

Hereinbelow, embodiments of the present invention are described with reference to the drawings. FIGS. 1a and 1b are side views of a powdery- or granular-material combination weigher according to one embodiment of the present invention, and FIGS. 2a and 2b are plan views illustrating a volumetric feeder for a powdery- or granular-material combination weigher, attached to the powdery- or granular-material combination weigher of FIGS. 1a and 1b. FIGS. 1a and 1b depict only one of the scale units 10 that constitute the combination weigher but, in reality, the combination weigher is made up of a plurality of scale units 10. This also applies to the following embodiments represented in FIG. 3a and onward.

A powdery- or granular-material combination weigher of the present embodiment is that of reciprocating-type in which a plurality of scale units 10 are lined up linearly. In the present embodiment, a scale unit 10 comprises a volumetric feeder 20, and the volumetric feeder 20 has a plurality of feeder elements 20a, 20b, etc., as shown in FIGS. 2a and 2b. Each of the feeder elements 20a, 20b, etc. is provided with a stationary portion 21 and a movable volumetric measure 22 capable of moving back and forth in the stationary portion 21, and each of the movable volumetric measures 22 is provided with a measure portion 23 for accommodating a predetermined volume of powdery or granular material. In addition, a raw-material-supplying hopper 15 for supplying a powdery or granular material to the measure portion 23 is attached to a charging aperture 24 of each stationary portion 21, as shown in FIGS. 1a and 1b, and a weighing hopper 12 for weighing the powdery or granular material that is discharged from the measure portion 23 is placed for a discharging aperture 26 of each stationary portion 21. The weighing hopper 12 is supported by a load cell 13 for weighing the weight of the powdery or granular material. A chute 14 for discharging the already weighed powdery or granular material is placed under the weighing hopper 12. Dust-proof bellows 18 for preventing leakage of the powdery or granular material are attached between the discharging aperture 26 of the stationary portion 21 and the weighing hopper 12, between the weighing hopper 12 and the chute 14, and on a supporting portion 13a of the load cell 13.

In the present embodiment, the feeder elements 20a, 20b, etc. of the volumetric feeder 20 are provided with respective stationary portions 21 and movable volumetric measures 22 that are independent of one another. Specifically, the movable volumetric measures 22 of the respective feeder elements 20a, 20b, etc. can move independently one another between a powdery- or granular-material-charging position, shown in FIG. 2a, and a powdery- or granular-material-discharging position, shown in FIG. 2b. Such driving of the movable volumetric measures 22 can be performed by an air cylinder, a motor, or the like. Such independent driving of the movable volumetric measures 22 makes it possible to supply the powdery or granular material only to the weighing hoppers 12 that have been emptied among the plurality of weighing hoppers 12 by moving the measure portions 23 from the charging position, shown in FIG. 2a, to the discharging position, shown in FIG. 2b. Thus, a selecting means can be configured by selectively driving the movable volumetric measures 22 in this manner. With the function of this selecting means, the function as a combination weigher for a powdery or granular material can be exhibited.

Figure 3A:
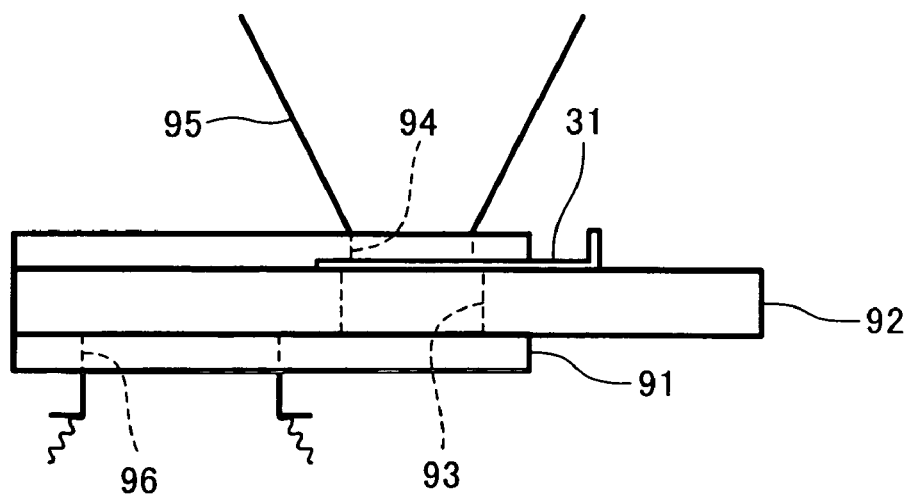
FIGS. 3a and 3b are partial side views of a powdery- or granular-material combination weigher according to another embodiment of the present invention.
Figure 3B:
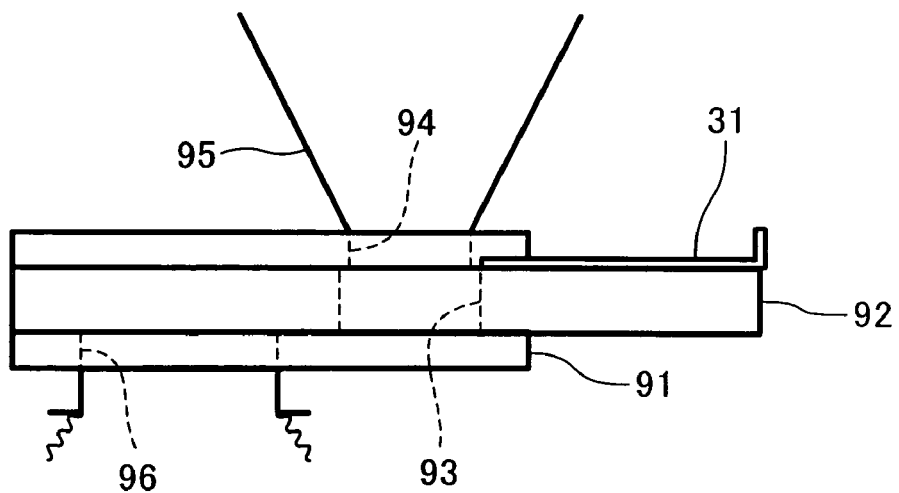
Figure 9A:
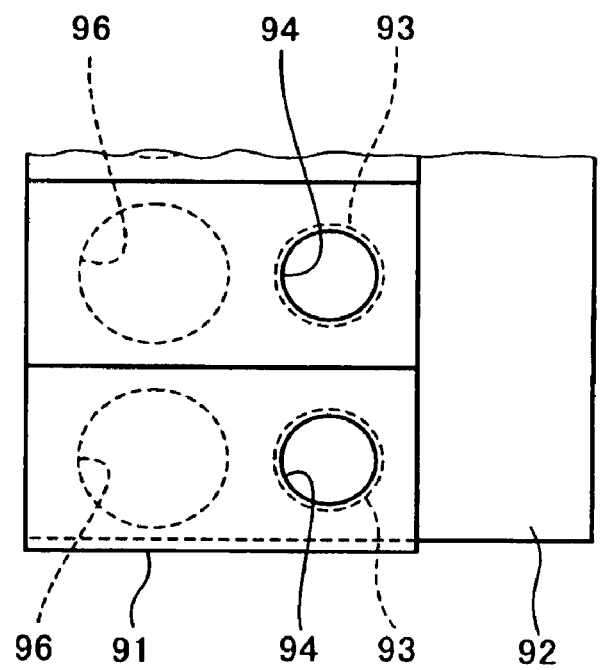
FIGS. 9a and 9b are plan views of a conventional multiple volumetric feeder.

FIGS. 3a and 3b are partial side views of a powdery- or granular-material combination weigher according to another embodiment of the present invention. The powdery- or granular-material combination weigher of the present embodiment has a configuration in which the previously described conventional volumetric feeder as shown in FIGS. 8a to 9b is provided with a charge-restricting plate 31 (see FIG. 3a). This charge-restricting plate 31 is provided at the charging position at which a powdery or granular material is charged, as illustrated in FIG. 3a, and serves the function to select whether or not the powdery or granular material is charged to a measure portion 93. Specifically, as shown in FIG. 3a, this charge-restricting plate 31 closes a charging aperture 94 of a stationary portion 91 when the powdery or granular material remains undischarged in a weighing hopper 12 (see FIG. 1) located below a discharging aperture 96 and, thereby, it functions so that the powdery or granular material will not be charged into measure portions other than the selected measure portion 93 even when all the measure portions 93 are moved, as shown in FIG. 9a, to the location of the charging apertures 94. Thus, even when the movable volumetric measure 92 moves toward the left side of FIG. 3a and the measure portion 93 reaches the discharging position above the discharging aperture 96, the powdery or granular material is not charged into the weighing hopper 12. On the other hand, when the powdery or granular material does not remain in the weighing hopper 12, the charge-restricting plate 31 is opened as shown in FIG. 3b to supply the powdery or granular material only to the selected measure portions 93 and, thereby, the powdery or granular material is supplied to the weighing hopper 12 the next time the movable volumetric measure 92 moves to the left and the measure portion 93 reaches the discharging position above the discharging aperture 96. Thus, in the present embodiment, the charge-restricting plate 31 functions as the selecting means.

It should be noted that, in the present embodiment, when the position of the charge-restricting plate 31 is adjusted so that the charge-restricting plate 31 closes part of the measure portion 93, the charge-restricting plate 31 can function as a weight-controlling means similar to a later-described opening-size adjusting plate 66 shown in FIG. 6a.

Figure 4A:
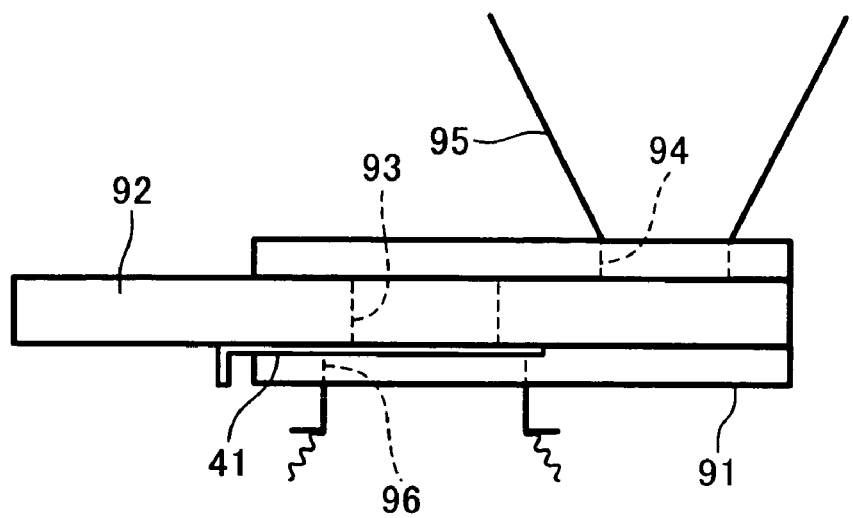
FIGS. 4a and 4b are partial side views of a powdery- or granular-material combination weigher according to further embodiment of the present invention.
Figure 4B:
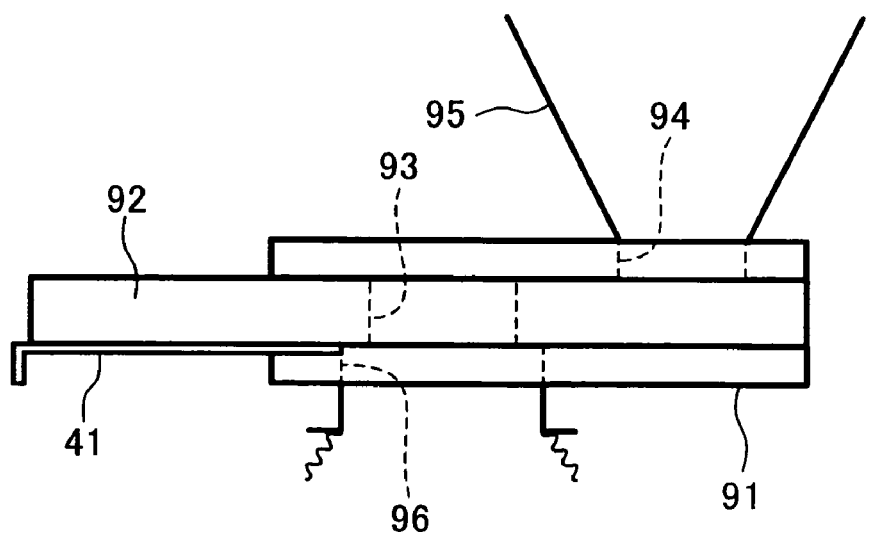
Figure 9B:
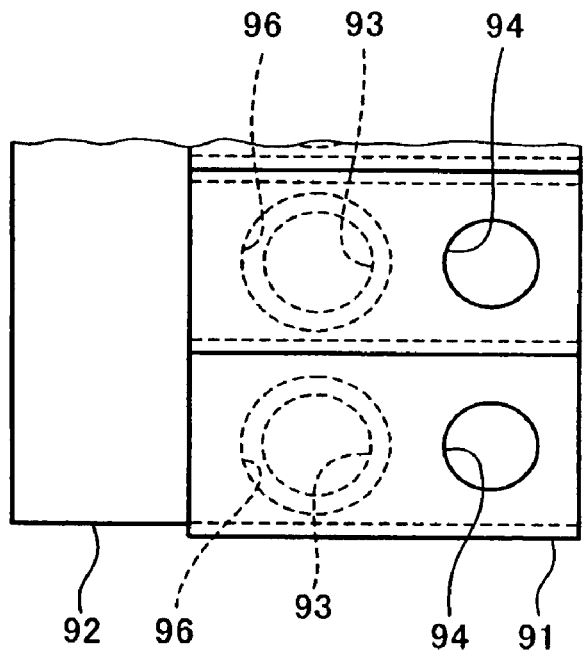
Figure 10:
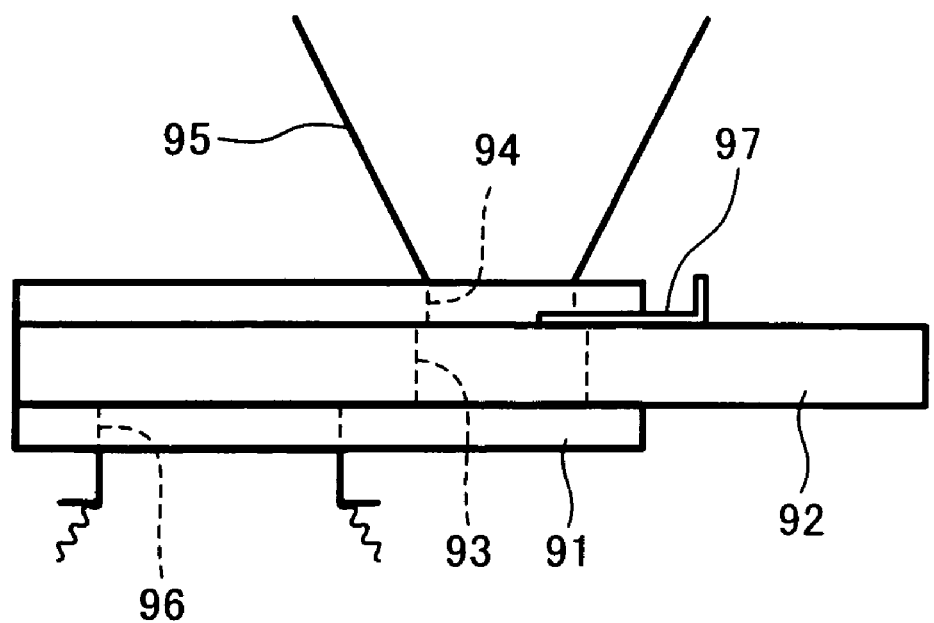
FIG. 10 is a side view of a conventional combination weigher having a gate for manually changing the weight of a raw material that goes into a measure of the volumetric feeder.

FIGS. 4a and 4b are partial side views of a powdery- or granular-material combination weigher according to further embodiment of the present invention. The powdery- or granular-material combination weigher of the present embodiment has a configuration in which the previously described conventional volumetric feeder illustrated in FIGS. 8a to 9b is provided with a discharge-restricting plate 41 (see FIGS. 4a and 4b). This discharge-restricting plate 41 is, as shown in FIG. 4a, provided at the discharging position at which the powdery or granular material is discharged to a weighing hopper 12 (see FIGS. 1a and 1b) and serves the function to select whether or not the powdery or granular material is discharged from the measure portion 93 to the weighing hopper 12. Specifically, this discharge-restricting plate 41 closes a discharging aperture 96 of a stationary portion 91, as shown in FIG. 4a, when the powdery or granular material remains undischarged in the weighing hopper 12 (see FIGS. 1a and 1b) located below the discharging aperture 96, and thereby, it functions so that the powdery or granular material is not charged to other weighing hoppers than the selected weighing hoppers 12 even when all the measure portions 93 are moved to the location of the discharging apertures 96 as shown in FIG. 9b. On the other hand, when the powdery or granular material does not remain in the weighing hopper 12, the discharge-restricting plate 41 is opened as shown in FIG. 3b so that the powdery or granular material can be supplied from the measure portions 93 to the selected weighing hoppers 12. Thus, in the present embodiment, the discharge-restricting plate 41 functions as the selecting means.

It should be noted that, in the present embodiment, when the discharge-restricting plate 41 does not open, the measure portion 93 moves to the position below the charging aperture 94 with the powdery or granular material being contained therein, and the powdery or granular material inside the measure portion 93 is additionally given a pressure of the powdery or granular material from the raw-material-supplying hopper 95. Although this increases the bulk specific gravity of the powdery or granular material in the measure portion 93, the increase in the bulk specific gravity of the powdery or granular material in the measure portion 93 is rather preferable because it is presupposed that the weights of the powdery or granular material in the weighing hoppers have a certain degree of variation in a combination weigher.

Figure 5A:
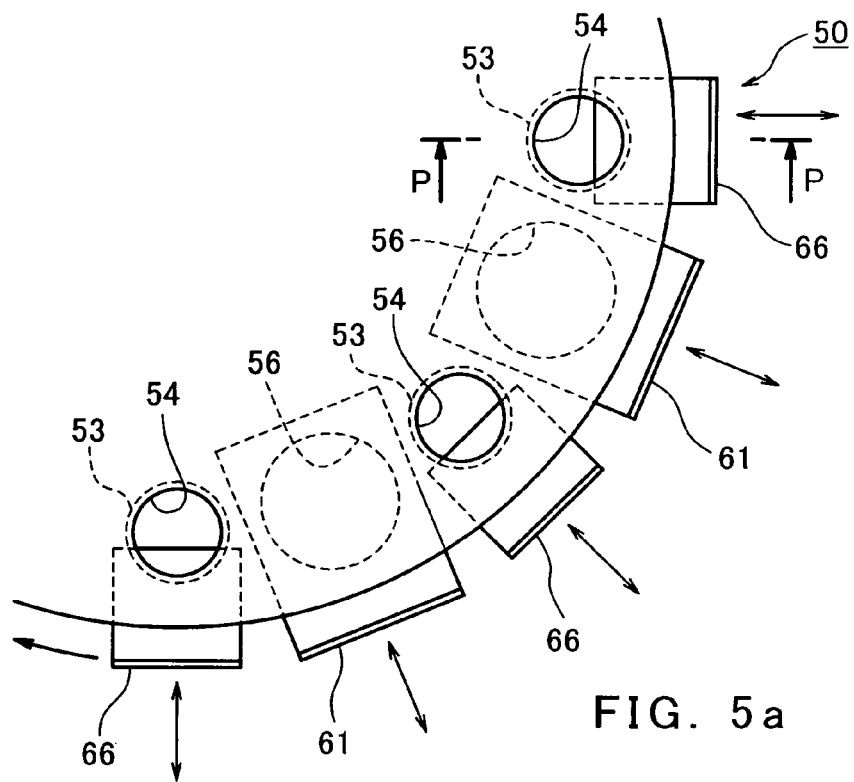
FIGS. 5a and 5b are partial plan views of a volumetric feeder in a powdery- or granular-material combination weigher according to another embodiment of the present invention.
Figure 5B:
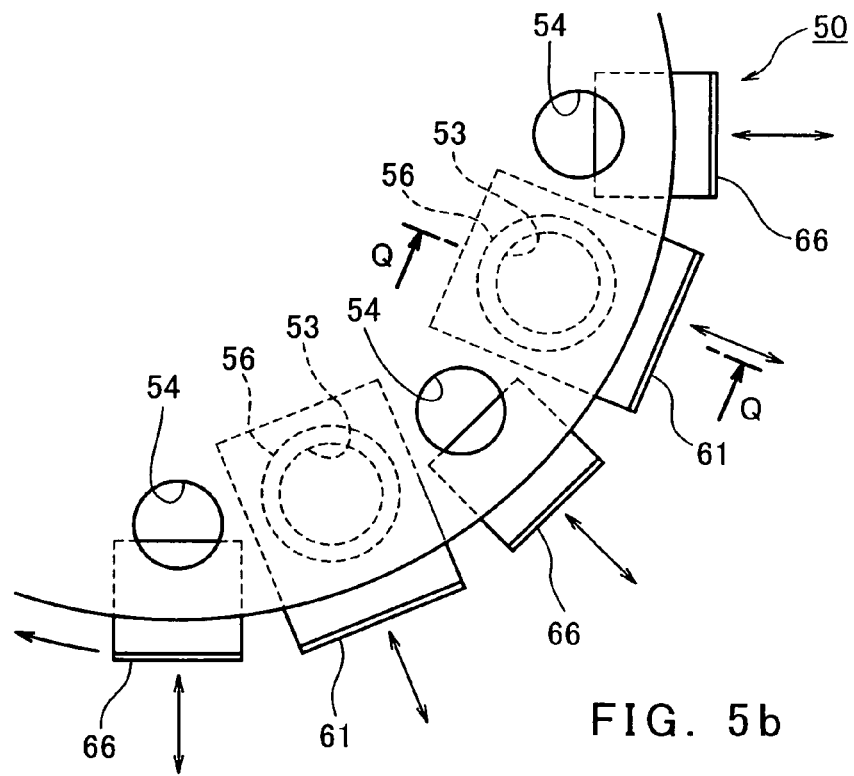
Figure 6A:
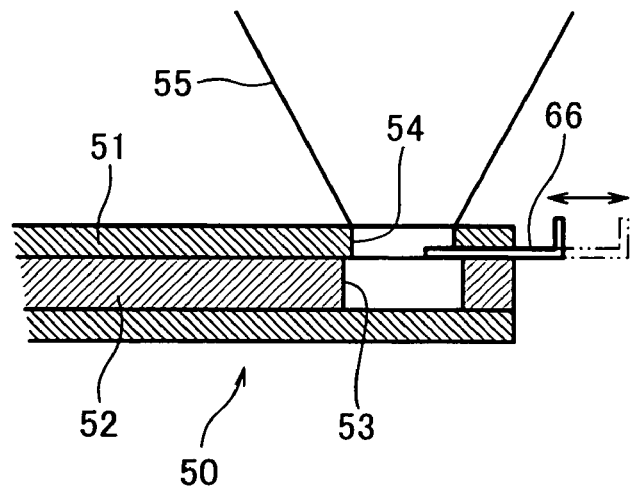
FIGS. 6a and 6b are a cross-sectional view taken along line P-P in FIG. 5a and a cross-sectional view taken along line Q-Q in FIG. 5b, respectively.
Figure 6B:
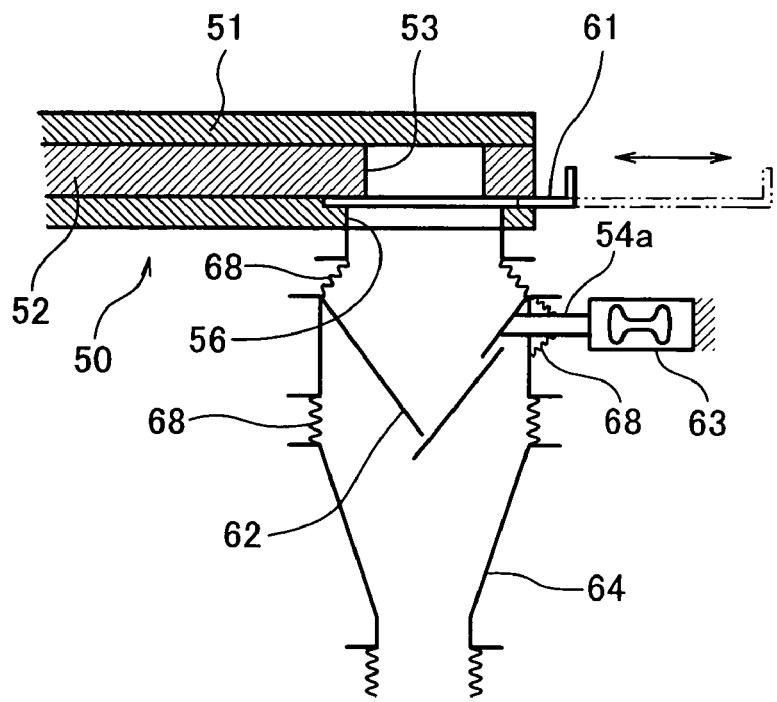

FIGS. 5a and 5b are partial plan views of a volumetric feeder 50 in a powdery- or granular-material combination weigher according to another embodiment of the present invention, and FIGS. 6a and 6b are a cross-sectional view taken along line P-P in FIG. 5a and a cross-sectional view taken along line Q-Q in FIG. 5b, respectively. The volumetric feeder 50 illustrated in FIGS. 5a and 5b is that of rotating-type, and as shown in FIGS. 6a and 6b, it is provided with a stationary portion 51 and a disk-shaped movable volumetric measure 52 that can rotate and move within the stationary portion 51. The peripheral portion of the movable volumetric measure 52 is provided with a plurality of measure portions 53 for accommodating a predetermined volume of powdery or granular material. Further, charging apertures 54 and discharging apertures 56 are alternately provided along the peripheral portion of the stationary portion 51. The charging apertures 54 is for charging the powdery or granular material from a raw-material-supplying hopper 55 (see FIG. 6a) to a measure portion 53, and the discharging aperture 56 is for discharging the powdery or granular material from the measure portion 53 to a weighing hopper 62. The weighing hopper 62 is supported by a load cell 63 for weighing the weight of a powdery or granular material, and a chute 64 for discharging the already weighed powdery or granular material is disposed under the weighing hopper 62. Dust-proof bellows 68 for preventing leakage of the powdery or granular material are attached between the discharging aperture 56 of the stationary portion 51 and the weighing hopper 62, between the weighing hopper 62 and the chute 64, and on a supporting portion 63a of the load cell 63. Further, in the present embodiment, discharge-restricting plates 61 are provided for the discharging apertures 56 of the stationary portion 51, and opening-size adjusting plates 66 are provided for the charging apertures 54. The discharge-restricting plates 61 are provided in order to restrict the charging of the powdery or granular material from the measure portions 53 to the weighing hoppers 62. On the other hand, the opening-size adjusting plates 66 function as weight-controlling means for producing a variation in weights of the powdery or granular material charged from the raw-material-supplying hoppers 55 to the measure portions 53.

In the present embodiment, the movable volumetric measure 52 rotates in a circumference direction by a predetermined angle and thereby sequentially moves between a charging position (FIG. 5a) where the measure portions 53 coincide with the charging apertures 54 and a discharging position (FIG. 5b) where the measure portions 53 coincide with the discharging apertures 56. At the charging position, as shown in FIG. 5a, by adjusting the position of the opening-size adjusting plates 66 so as to close part of the measure portions 53, the weight of the powdery or granular material charged into the measure portions 53 is adjusted. In the present embodiment, the position of the opening-size adjusting plates 66 is set so that the weights of the powdery or granular material in the measure portions 53 can be classified into a plurality of kinds, for example, "normal," "large," and "small." Then, in charging the raw material to those weighing hoppers that have been used for the combination, the distribution of the weights of the raw materials that have already been charged into the weighing hoppers is identified, and the quantities of the powdery or granular material that is to be newly charged into the measure portions 53 are adjusted by the position of the opening-size adjusting plates 66 so that the respective numbers of the weights of the powdery or granular material in the weighing hoppers that are classified into "normal," "large," and "small" are approximately equal to one another.

When the powdery or granular material is charged into the measure portions 53, the movable volumetric measure 52 next rotates in the circumference direction by a predetermined angle and, as shown in FIG. 5b, the measure portions 53 move to the discharging position. At that time, in the case where the powdery or granular material remains undischarged in a weighing hopper 62, the discharge-restricting plate 61 moves to such a position as to close the discharging aperture 56, whereas in the case where the powdery or granular material has been discharged to the weighing hopper 62 and is not left therein, the discharge-restricting plate 61 is moved to a position such that the discharging aperture 56 is open. Such a function of the discharge-restricting plate 61 makes it possible to supply the powdery or granular material only to the weighing hoppers that have been used for the combination and emptied. Furthermore, since the opening-size adjusting plates are provided, an appropriate variation is generated in weights of the powdery or granular material supplied to the weighing hoppers 62, and consequently, the combinatorial computing can be easily achieved.

Figure 7A:
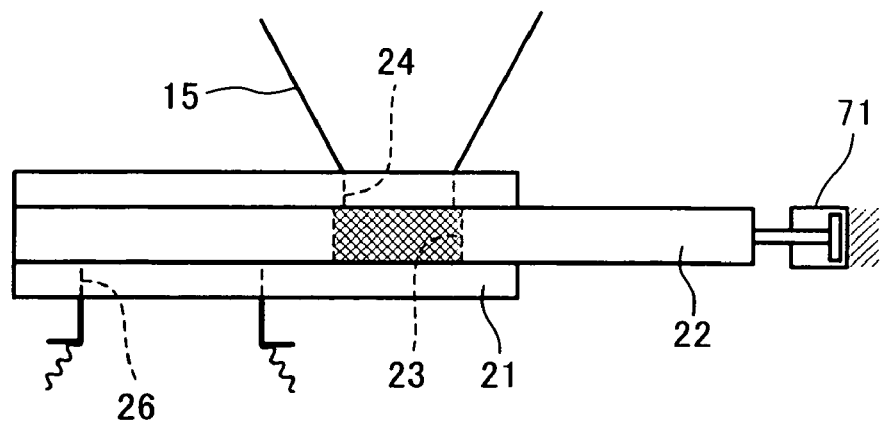
FIGS. 7a and 7b are side views illustrating a powdery- or granular-material combination weigher having a weight-controlling means according to another embodiment.
Figure 7B:
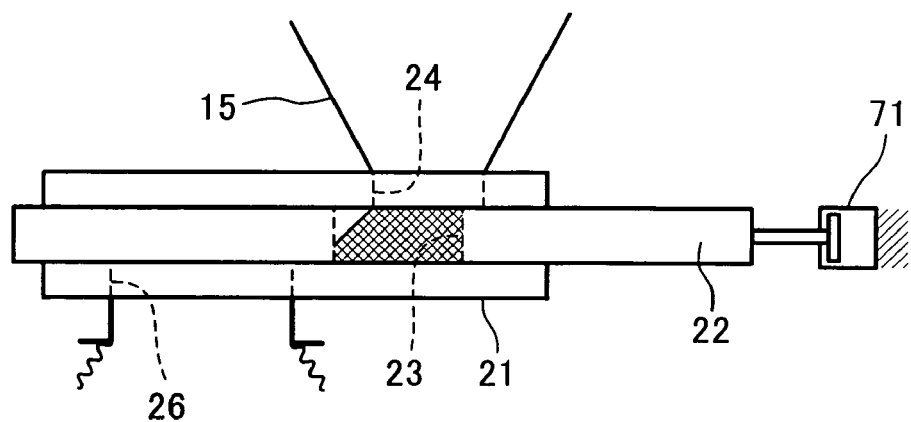
Figure 8A:
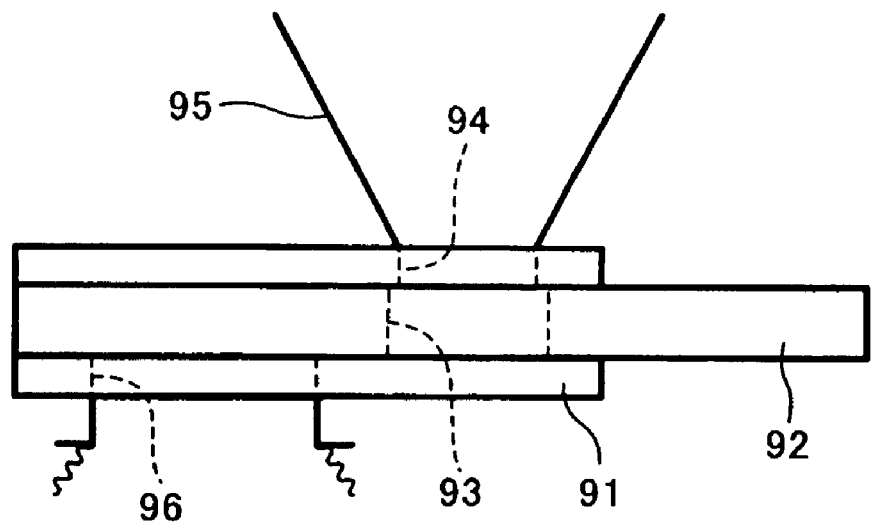
FIGS. 8a and 8b are side views of a conventional combination weigher.
Figure 8B:
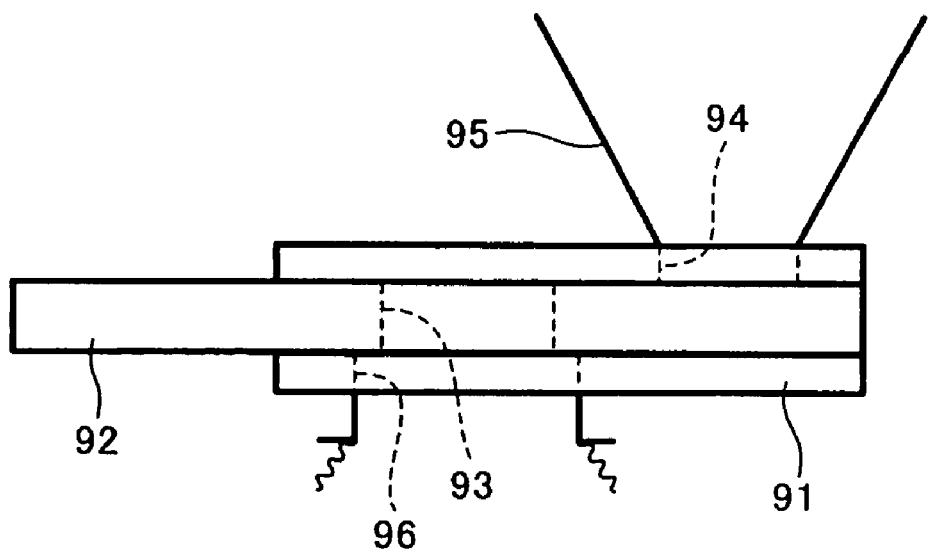

FIGS. 7a and 7b are side views illustrating, according to another embodiment, a powdery- or granular-material combination weigher having a weight-controlling means. In the present embodiment, a stopper 71 is provided as a weight-controlling means in the powdery- or granular-material combination weigher illustrated in FIGS. 1a to 2b. In the powdery- or granular-material combination weigher of the present embodiment, in a state in which a charging aperture 24 of a stationary portion 21 completely coincides with a measure portion 23 of a movable volumetric measure 22, the measure portion 23 is completely filled with a powdery or granular material, as shown in FIG. 7a. On the other hand, by adjusting the stopper 71, it is possible to obtain a state in which the charging aperture 24 of the stationary portion 21 does not coincide with the measure portion 23 of the movable volumetric measure 22. In this state, as shown in FIG. 7b, the measure portion 23 is not completely filled with the powdery or granular material and accordingly the weight of the powdery or granular material in the measure portion 23 becomes less. Thus, by changing the position of the stopper 71, it is possible to generate a variation in weights of the powdery or granular material charged into the weighing hoppers 12 (see FIGS. 1a and 1b).

INDUSTRIAL APPLICABILITY

Because, in the present invention, a selecting means for supplying a powdery or granular material only to the weighing hoppers of the selected scale units among a plurality of scale units is provided, the powdery or granular material can be supplied only to the weighing hoppers of the scale units that have been used for a combination and emptied.

The present invention also provides a movable volumetric measure that moves between a charging position and a discharging position, and this makes it possible to supply a powdery or granular material only to the weighing hoppers of the selected scale units by controlling the movement of the movable volumetric measure between the charging position and the discharging position.

Furthermore, a configuration is possible in which a volumetric feeder is provided with a charge-restricting plate at a powdery- or granular-material charging position, or a discharge-restricting plate for a powdery- or granular-material discharging position, and this also makes it possible to supply a powdery or granular material only to the weighing hoppers of the scale units that have been used for a combination and emptied.

The present invention also provides, in order to generate a variation in weights of the powdery or granular material supplied to the weighing hoppers, a weight-controlling means, which is constituted by a movable volumetric measure capable of adjusting a charging position, or an opening-size adjusting plate provided for a charging aperture for the powdery or granular material. This makes it possible to generate an appropriate variation in weights of the powdery or granular material supplied to the weighing hoppers of the scale units and to use the powdery or granular material in all the weighing hoppers for a combination.

A powdery- or granular-material combination weigher of the present invention is provided with the above-described volumetric feeder as a feeder for a powdery or granular material. This makes it possible to supply the powdery or granular material only to the weighing hoppers of the scale units that have been used for a combinatorial computing and emptied, and thus to adopt a combination weigher for weighing powdery or granular materials. Furthermore, an appropriate variation is generated in weights of the powdery or granular material supplied to the weighing hoppers of the scale units, and the powdery or granular material in all the weighing hoppers can be used for a combination.

The invention claimed is:

1. A volumetric feeder used for a powdery or granular material combination weigher provided with a plurality of raw-material-supplying hoppers and a corresponding plurality of scale units having respective weighing hoppers, the volumetric feeder comprising:

a movable volumetric measure including a plurality of measure portions each having a predetermined constant volume and configured to move between a charging position adjacent a charging aperture of a raw-material-supplying hopper, at which a predetermined volume of powdery or granular material is charged, and a discharging position adjacent a charging aperture of a corresponding weighing hopper, at which the powdery or granular material is discharged to the corresponding weighing hopper;

a selecting means for each measure portion, each of the plurality of selecting means being independently driven to selectively supply the powdery or granular material from one or more of the associated measure portions only to corresponding weighing hoppers that are associated with a subset of scale units selected from the plurality of scale units, the corresponding weighing hoppers associated with the subset of scale units having been used for a combination and emptied while powdery or granular material remains undischarged in other of the weighing hoppers; and wherein each measure portion is bounded by a selectively openable top side, a selectively openable bottom side, and an outer perimeter wall completely surrounding the predetermined volume, and wherein in the charging position the measure portion is configured to receive the predetermined volume of powdery or granular material through an opening in the top side of the measure portion while an opening in the bottom side of the measure portion is closed, and wherein in the discharging position the measure portion is configured to discharge the predetermined volume of powdery or granular material through the opening in the bottom side of the measure portion, while the opening in the top side of the measure portion is closed.

2. The volumetric feeder according to claim 1, wherein the selecting means controls moving of the movable volumetric measure between the charging position and the discharging position, whereby the powdery or granular material is supplied only to the corresponding weighing hoppers of the subset of selected scale units.

3. The volumetric feeder according to claim 1, wherein the selecting means is a charge-restricting plate provided at the charging position.

4. The volumetric feeder according to claim 1, wherein the selecting means is a discharge-restricting plate provided at the discharging position.

5. The volumetric feeder according to claim 1, wherein the volumetric feeder comprises a weight-controlling means for producing a variation in weights of the powdery or granular material supplied to the weighing hoppers.

6. The volumetric feeder according to claim 5, wherein the weight-controlling means generates the variation in weights of the powdery or granular material supplied to the weighing hoppers by adjusting the charging position of the movable volumetric measure.

7. The volumetric feeder according to claim 5, wherein the weight-controlling means is an opening-size adjusting plate provided at a charging aperture for the powdery or granular material in the movable volumetric measure.

8. A powdery or granular material combination weigher, comprising a volumetric feeder including:
a plurality of raw-material-supplying hoppers and a corresponding plurality of scale units having respective weighing hoppers;
a movable volumetric measure including a plurality of measure portions each having a predetermined constant volume and configured to move between a charging position adjacent a charging aperture of a raw-material-supplying hopper, at which a predetermined volume of powdery or granular material is charged, and a discharging position adjacent a charging aperture of a corresponding weighing hopper, at which the powdery or granular material is discharged to the corresponding weighing hopper;
a selector operatively coupled to each of the plurality of scale units, each of the plurality of selectors being independently driven to supply the powdery or granular material from one or more of the associated measure portions only to corresponding weighing hoppers that are associated with a subset of selected scale units from among the plurality of scale units, the corresponding weighing hoppers associated with the subset of selected scale units having been used for a combination and emptied while powdery or granular material remains undischarged in other of the weighing hoppers; and
wherein each measure portion is bounded by a selectively openable top side, a selectively openable bottom side, and an outer perimeter wall completely surrounding the predetermined volume, and wherein in the charging position the measure portion is configured to receive the predetermined volume of powdery or granular material through an opening in the top side of the measure portion while an opening in the bottom side of the measure portion is closed, and wherein in the discharging position the measure portion is configured to discharge the predetermined volume of powdery or granular material through the opening in the bottom side of the measure portion, while the opening in the top side of the measure portion is closed.

9. The combination weigher according to claim 8, wherein the selector controls moving of the movable volumetric measure between the charging position and the discharging position, whereby the powdery or granular material is supplied only to the corresponding weighing hoppers of the subset of selected scale units.

10. The combination weigher according to claim 8, wherein the selector includes a charge-restricting plate provided at the charging position.

11. The combination weigher according to claim 8, wherein the selector includes a discharge-restricting plate provided at the discharging position.

12. The combination weigher according to claim 8, wherein the volumetric feeder further is provided with
a weight controller configured to produce a variation in weights of the powdery or granular material supplied to the weighing hoppers.

13. The combination weigher according to claim 12, wherein the weight controller is configured to generate the variation in weights of the powdery or granular material supplied to the weighing hoppers by adjusting the charging position of the movable volumetric measure.

14. The combination weigher according to claim 12, wherein the weight controller includes an opening-size adjusting plate provided at a charging aperture for the powdery or granular material in the movable volumetric measure.

* * * * *